United States Patent
Hu et al.

(10) Patent No.: US 7,742,134 B2
(45) Date of Patent: Jun. 22, 2010

(54) TRANSFLECTIVE COLOR-BALANCED LIQUID CRYSTAL DISPLAY

(75) Inventors: Chih-Jen Hu, Hsinchu (TW); Chih-Ming Chang, Jhongli (TW)

(73) Assignee: Au Optronics Corporation, Hsinchu (TW)

( * ) Notice: Subject to any disclaimer, the term of this patent is extended or adjusted under 35 U.S.C. 154(b) by 1505 days.

(21) Appl. No.: 11/008,885

(22) Filed: Dec. 9, 2004

(65) Prior Publication Data
US 2006/0125983 A1 Jun. 15, 2006

(51) Int. Cl.
*G02F 1/1335* (2006.01)
*G02F 1/1343* (2006.01)

(52) U.S. Cl. .................... 349/114; 349/144
(58) Field of Classification Search ............ 349/114, 349/129, 130, 144, 113
See application file for complete search history.

(56) References Cited

U.S. PATENT DOCUMENTS

| | | | |
|---|---|---|---|
| 4,600,274 A | 7/1986 | Morozumi | 350/339 |
| 4,946,259 A | 8/1990 | Matino et al. | 350/339 |
| 5,233,385 A | 8/1993 | Sampsell | 355/35 |
| 5,793,345 A | 8/1998 | Silverbrook | 345/89 |
| 5,929,843 A | 7/1999 | Tanioka | 345/150 |
| 6,215,538 B1 | 4/2001 | Narutaki et al. | 349/106 |
| 6,501,521 B2 * | 12/2002 | Matsushita et al. | 349/106 |
| 6,542,209 B2 | 4/2003 | Kim et al. | 349/106 |
| 6,862,059 B2 | 3/2005 | Murai et al. | 349/114 |
| 7,030,946 B2 | 4/2006 | Iijima et al. | 349/106 |
| 2001/0019382 A1 | 9/2001 | Song et al. | 349/106 |
| 2002/0122160 A1 | 9/2002 | Kunzman | 353/31 |
| 2004/0046725 A1 | 3/2004 | Lee | 345/88 |
| 2004/0095521 A1 | 5/2004 | Song et al. | 349/61 |
| 2005/0213002 A1 * | 9/2005 | Wen et al. | 349/114 |
| 2005/0237450 A1 * | 10/2005 | Hu et al. | 349/108 |
| 2006/0119770 A1 * | 6/2006 | Ting et al. | 349/114 |

FOREIGN PATENT DOCUMENTS

CN 1460878 A 12/2003
JP 2003255379 9/2003

* cited by examiner

*Primary Examiner*—David Nelms
*Assistant Examiner*—David Y Chung
(74) *Attorney, Agent, or Firm*—Ware, Fressola, Van Der Sluys & Adolphson, LLP

(57) ABSTRACT

In a transflective liquid crystal display comprising a plurality of pixels, each is divided into three color sub-pixels in red, green and blue. Each of the color sub-pixels is further divided into a main sub-pixel and an auxiliary sub-pixel. The main sub-pixel comprises a transflective area and a reflective area. The auxiliary sub-pixel can be entirely transmissive, reflective or partially transmissive and reflective. The liquid crystal display further comprises a plurality of first gate lines for electrically controlling the main sub-pixels and a plurality of second gate lines for electrically controlling the auxiliary sub-pixels. The auxiliary sub-pixels may have a color filter for partially filtering light encountering the auxiliary sub-pixels according to the color of the color sub-pixels.

26 Claims, 7 Drawing Sheets

TRANSFLECTIVE COLOR-BALANCED LIQUID CRYSTAL DISPLAY

FIELD OF THE INVENTION

The present invention relates generally to a liquid crystal display panel and, more particularly, to a transflective-type liquid crystal display panel.

BACKGROUND OF THE INVENTION

Due to the characteristics of thin profile and low power consumption, liquid crystal displays (LCDs) are widely used in electronic products, such as portable personal computers, digital cameras, projectors, and the like. Generally, LCD panels are classified into transmissive, reflective, and transflective types. A transmissive LCD panel uses a back-light module as its light source. A reflective LCD panel uses ambient light as its light source. A transflective LCD panel makes use of both the back-light source and ambient light.

As known in the art, a color LCD panel 1 has a two-dimensional array of pixels 10, as shown in FIG. 1. Each of the pixels comprises a plurality of sub-pixels, usually in three primary colors of red (R), green (G) and blue (B). These RGB color components can be achieved by using respective color filters. FIG. 2 illustrates a plan view of the pixel structure in a conventional transflective liquid crystal panel, and FIG. 3 is a cross sectional view of the pixel structure. As shown in FIG. 2, a pixel can be divided into three sub-pixels 12R, 12G and 12B and each sub-pixel can be divided into a transmission area (TA) and a reflection area (RA). In the transmission area as shown in FIG. 3a, light from a back-light source enters the pixel area through a lower substrate 30, and goes through a liquid crystal layer, a color filter R and the upper substrate 20. In the reflection area, light encountering the reflection area goes through an upper substrate 20, the color filter R and the liquid crystal layer before it is reflected by a reflective layer 52. Alternatively, part of the reflective area is covered by a non-color filter (NCF), as shown in FIG. 3b.

As known in the art, there are many more layers in each pixel for controlling the optical behavior of the liquid crystal layer. These layers may include a device layer 50 and one or two electrode layers. The device layer is typically disposed on the lower substrate and comprises gate lines 31, 32, data lines 21-24 (FIG. 2), transistors, and passivation layers (not shown).

Due to the simplicity in the pixel structure of the conventional transflective LCD panel, high chromaticity is difficult to achieve.

SUMMARY OF THE INVENTION

The present invention provides a method and a pixel structure for improving the chromaticity, or color quality of a transflective-type liquid crystal display. The pixel structure of a pixel in the liquid crystal display comprises a plurality of sub-pixel segments. Each of the sub-pixel segments comprises a color sub-pixel and an auxiliary sub-pixel associated with the color sub-pixel. Each of the color sub-pixels comprises a transmission area and a reflection area and a color filter covering both the transmission area and the reflection area. Each of the auxiliary sub-pixels comprises a reflection area and is tailored to suit the optical characteristics of the liquid crystal display. The liquid crystal display further comprises a plurality of first gate lines for electrically controlling the main sub-pixels and a plurality of second gate lines for electrically controlling the auxiliary sub-pixels. The auxiliary sub-pixels may have a color filter for partially filtering light encountering the auxiliary sub-pixels according to the color of the color sub-pixels.

Thus, the first aspect of the present invention to provide a method to improve viewing quality of a transflective liquid crystal display, the display having a plurality of pixels, at least some of the pixels comprising a plurality of sub-pixel segments. The method comprises:

sectioning at least one of the sub-pixel segments in each of said at least some pixels into a first sub-pixel and a second sub-pixel associated with the first sub-pixel; and sectioning the first sub-pixel into a transmission area and a reflection area.

According to the present invention, each of said plurality of sub-pixel segments in a pixel is associated with a color for viewing, said method further comprising:

filtering light encountering the first sub-pixel to provide the color associated with the sub-pixel segment.

According to the present invention, said plurality of sub-pixel segments in a pixel comprises three color sub-pixel segments in red, green and blue, said method further comprising:

filtering light encountering the first sub-pixel in each of said at least one of the sub-pixel segments to provide a color associated with the color sub-pixel segment.

According to the present invention, each of said plurality of sub-pixel segments in a pixel is associated with a color, and the display has a front side for viewing and an opposing backside, and wherein the display comprises a back-light source on the backside for supplying light through the transmission area for viewing, said method comprising:

filtering the light supplied through the transmission area to provide the color associated with the sub-pixel segment.

According to the present invention, an external light source provides reflected light in the reflection area, said method further comprising:

filtering the reflected light in the reflection area to provide the color associated with the sub-pixel segment.

According to the present invention, the method further comprises:

sectioning the second sub-pixel into a transmission area and a reflection area, and partially filtering light encountering the second sub-pixel according to the color associated with the sub-pixel segment.

The second aspect of the present invention provides a transflective display. The display comprises:

an electronically controllable optical medium for forming a plurality of pixels, wherein at least some of the pixels comprise a plurality of sub-pixel segments, each of the sub-pixel segments in a pixel associated with a color for viewing, and at least one of the sub-pixel segments in each of said at least some pixels comprises a first sub-pixel and a second sub-pixel associated with the first sub-pixel;

a color filter disposed in relationship to each of the sub-pixel segments for filtering light encountering the first sub-pixel for providing the color associated with said sub-pixel segment, wherein the first sub-pixel comprises a transmission area and a reflection area; and a device layer disposed in relationship to the electronically controllable optical medium for controlling the optical medium.

According to the present invention, the display further comprises:

a layer of reflection material disposed in each of said reflection areas for reflecting light encountering the reflection areas.

According to the present invention, the display further comprises:
a front side for viewing, and
an opposing backside to allow light to be transmitted from the backside to the front side through the transmission area and the color filter.

According to the present invention, the display further comprises:
a light source disposed in relationship to the backside to provide the transmitted light through the transmission area and the color filter.

According to the present invention, the device layer comprises
an electronic switching component disposed in relationship to the first sub-pixel for controlling the optical medium associated with the first sub-pixel; and
a different electronic switching component disposed in relationship to the second sub-pixel for controlling the optical medium associated with the second sub-pixel.

According to the present invention, the electronically controllable optical medium comprises a liquid crystal layer.

According to the present invention, each of at least some of the second sub-pixels is sectioned into a transmission sub-area and a reflection sub-area, but it is possible that the second sub-pixels are entirely transmissive or entirely reflective.

According to the present invention, at least some of the second sub-pixels comprise color filters for partially filtering light encountering the second sub-pixels according to the color associated with the sub-pixel segments.

According to the present invention, at least some of the second sub-pixels comprise light blocking sections for reducing the amount of light encountering the second sub-pixels.

According to the present invention, at least some of the second sub-pixels comprise non-color filters for transmitting light encountering the second sub-pixels.

According to the present invention, at least some of the second sub-pixels comprise color filters for partially filtering light encountering the second sub-pixels according to the color associated with the sub-pixel segments, wherein the color filters have higher transmissivity than the color filters for filtering light encountering the first sub-pixels.

According to the present invention, the plurality of sub-pixel segments in each of said at least some of the pixels comprise:
a first sub-pixel segment associated with a red color for viewing,
a second sub-pixel segment associated with a green color for viewing, and
a third sub-pixel segment associated with a blue color for viewing.

According to the present invention, the color filter associated with the third sub-pixel is larger than the color filter associated with the first sub-pixel, and the color filter associated with the first sub-pixel is larger than the color filter associated with the second sub-pixel.

According to the present invention, the second sub-pixel associated with the second sub-pixel segment is larger than the second sub-pixel associated with the first sub-pixel segment, and the second sub-pixel associated with the first sub-pixel segment is larger than the second sub-pixel associated with the third sub-pixel segment.

According to the present invention, the second sub-pixels associated with the first sub-pixel segment, the second sub-pixel segment and the third sub-pixel segment are substantially equal in area.

According to the present invention, the device layer is operatively connected to a first gate line for electrically controlling the optical medium associated with the first sub-pixels and a second gate line for electrically controlling the optical medium associated with the second sub-pixels.

The present invention will become apparent upon reading the description taken in conjunction with FIGS. 4a-11d.

DETAILED DESCRIPTION OF THE INVENTION

Figure 4A:
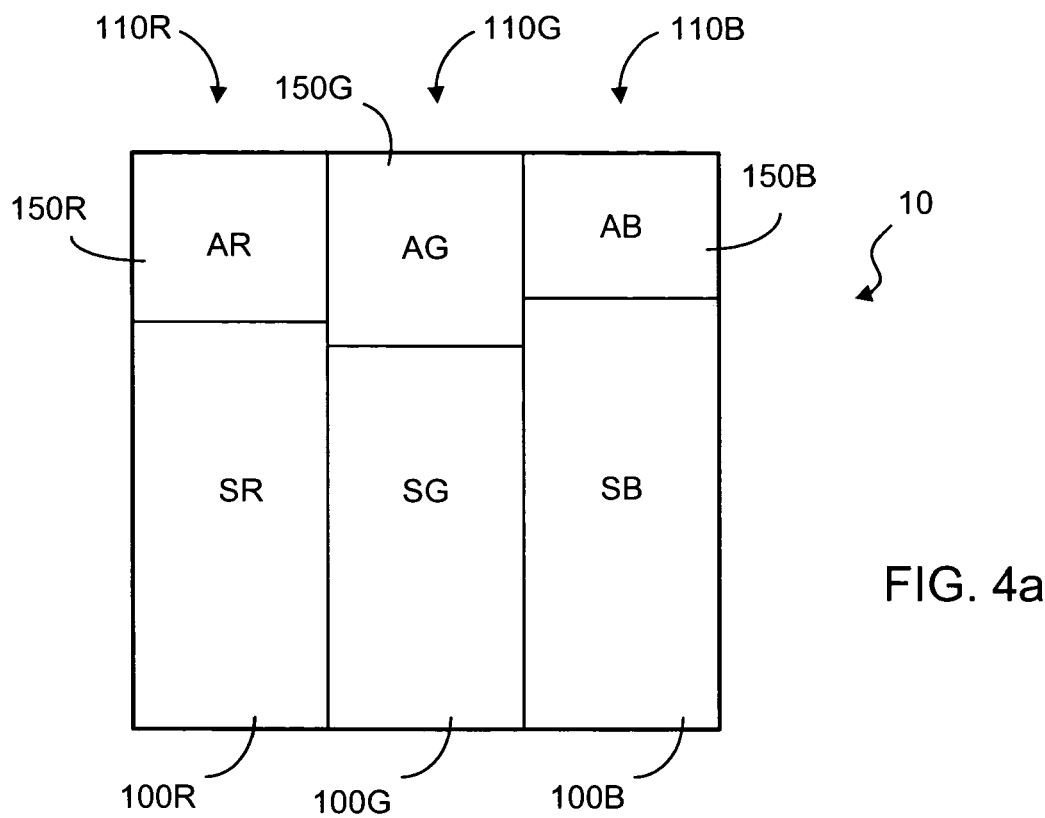
FIG. 4a is a schematic representation showing a general structure of a pixel in an LCD display, according to the present invention.
Figure 4B:
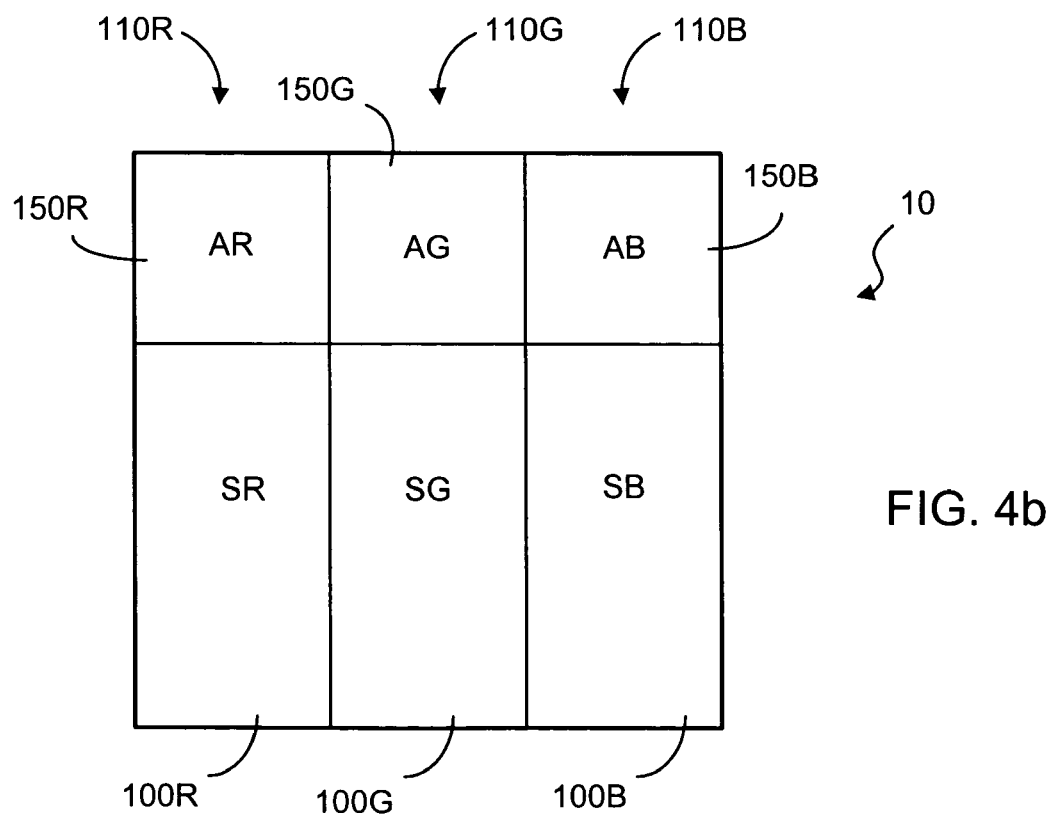
FIG. 4b is a schematic representation showing a general structure of a pixel in an LCD display, according to another embodiment of the present invention.

FIG. 4a is a schematic representation showing a plane view of a general structure of a pixel in an LCD display, according to one embodiment of the present invention. In FIG. 4a, the pixel 10 is a typical color picture element capable of showing at least three different color components in red (R), green (G) and blue (B). As shown in FIG. 4, the pixel 10 comprises three sub-pixel segments 110R, 110G and 110B for producing, respectively, the red component, green component and blue component in a color LCD display. The sub-pixel segment 110R comprises a color sub-pixel SR and an auxiliary sub-pixel AR associated with the color sub-pixel SR. Likewise, the sub-pixel segment 110G comprises a color sub-pixel SG and an auxiliary sub-pixel AG associated with the color sub-pixel SG, and the sub-pixel segment 110B comprises a color sub-pixel SB and an auxiliary sub-pixel AB associated with the color sub-pixel SB. The areas of the color sub-pixels SR, SG, SB are denoted by 100R, 100G, 100B. Likewise, the areas of the auxiliary sub-pixels AR, AG, AB are denoted by 150R, 150G and 150B. As shown in FIG. 4a, the area 150G is greater than the area 150R, which is greater than the area 150B. However, the areas 150R, 150G and 150B can be equal to each other, as shown in FIG. 4b.

The sub-pixel structure of the color sub-pixel SR is generally similar to that of the color sub-pixels SG and SB except that each of the color sub-pixels has a different color filter. For example, the color sub-pixel SR has a red color filter (see color filter 400R in FIGS. 8, 9 and 11a-11c), whereas the color sub-pixel SG has a green color filter (see color filter 400G in FIGS. 11a-11c), and the color sub-pixel SB has a blue color filter (see color filter 400B in FIGS. 11a-11c) to transmit light of selected wavelength regions. For simplicity, the present invention is described regarding the sub-pixel areas in one color (R) only.

Figure 5:
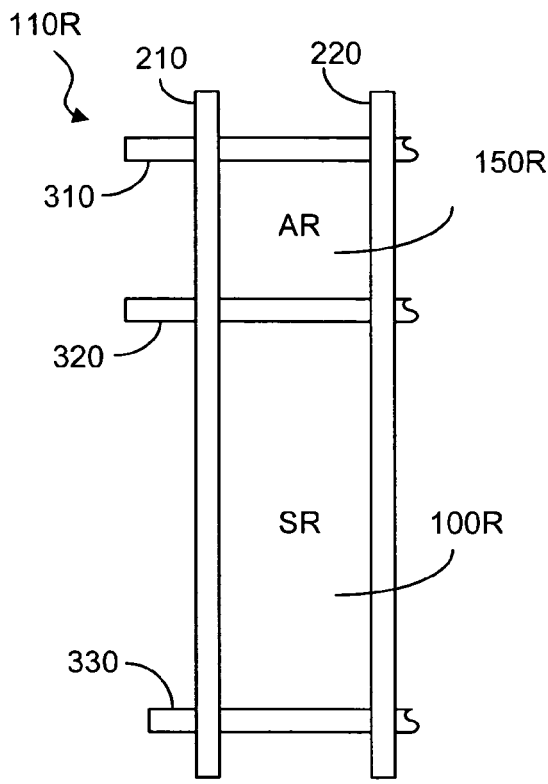
FIG. 5 is a schematic representation showing a general structure of a sub-pixel segment, according to the present invention.

FIG. 5 is a schematic representation showing a general structure of a sub-pixel segment. As shown in FIG. 5, the sub-pixel segment 110R comprises the sub-pixel SR and the auxiliary sub-pixel AR. The sub-pixel areas 100R and 150R are surrounded by data lines 210, 220 and gate lines 310, 320, 330. Data lines and gate lines are used for controlling the liquid crystal layer, typical of a LCD display.

Figure 6:
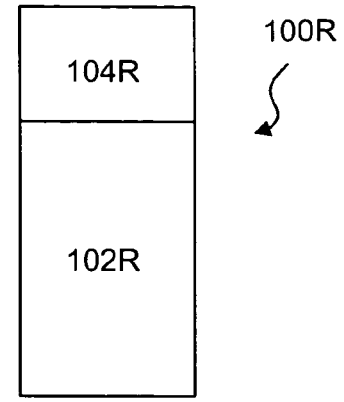
FIG. 6 is a schematic representation showing the sectioning of a color sub-pixel, according to the present invention.
Figure 7A:
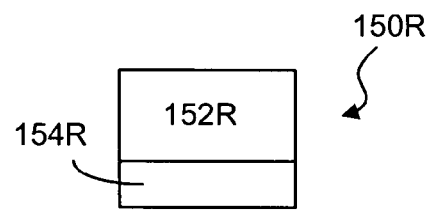
FIG. 7a is a schematic representation showing the sectioning of an auxiliary sub-pixel, according to one embodiment of the present invention.
Figure 7B:
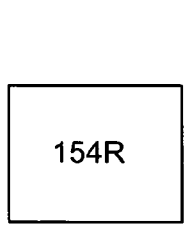
FIG. 7b is a schematic representation showing a different embodiment of an auxiliary sub-pixel, according to the present invention.
Figure 7C:
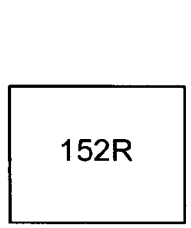
FIG. 7c is a schematic representation showing another embodiment of an auxiliary sub-pixel, according to the present invention.

The sub-pixel area 100R is divided into a transmission area 102R and a reflection area 104R, as shown in FIG. 6. Similarly, the auxiliary sub-pixel area 150R can also be divided into a transmission area 152R and a reflection area 154R, as shown in FIG. 7a. However, the auxiliary sub-pixel area 150R can be entirely reflective, as shown in FIG. 7b. The auxiliary sub-pixel area 150R can be also entirely transmissive, as shown in FIG. 7c. In the embodiments as described in conjunction with FIGS. 7a-7c, a neutral color filter or a substantially clear optical material (see element 450R in FIG. 9, for example) can be used to allow a light beam encountering the auxiliary sub-pixel area 150R to transmit therethrough without significantly changing its color.

Figure 7D:
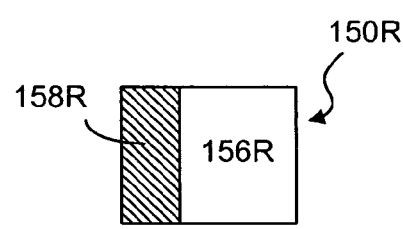
FIG. 7d is a schematic representation showing yet another embodiment of an auxiliary sub-pixel, according to the present invention.
Figure 7E:
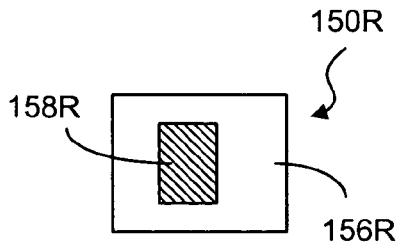
FIG. 7e is a schematic representation showing still another embodiment of an auxiliary sub-pixel, according to the present invention.
Figure 7F:
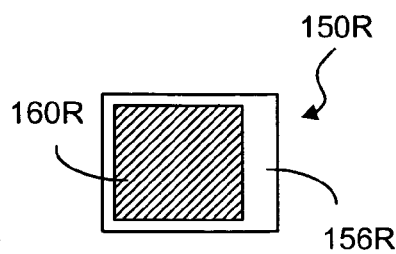
FIG. 7f is a schematic representation showing a further embodiment of an auxiliary sub-pixel, according to the present invention.
Figure 7G:
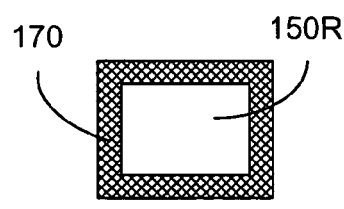
FIG. 7g is a schematic representation showing a method for modifying an auxiliary sub-pixel area, according to yet another embodiment of the present invention.
Figure 8:
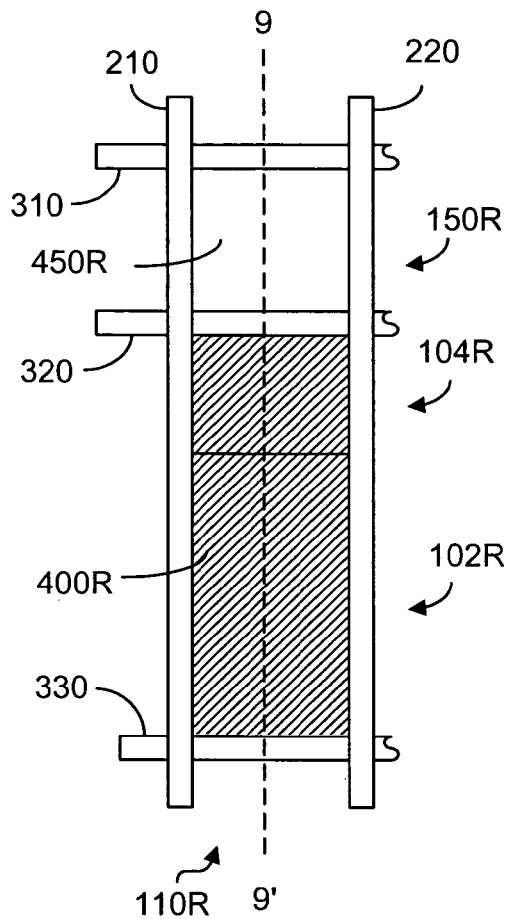
FIG. 8 is a schematic representation showing a sub-pixel structure of a sub-pixel segment, according to one embodiment of the present invention.
Figure 9:
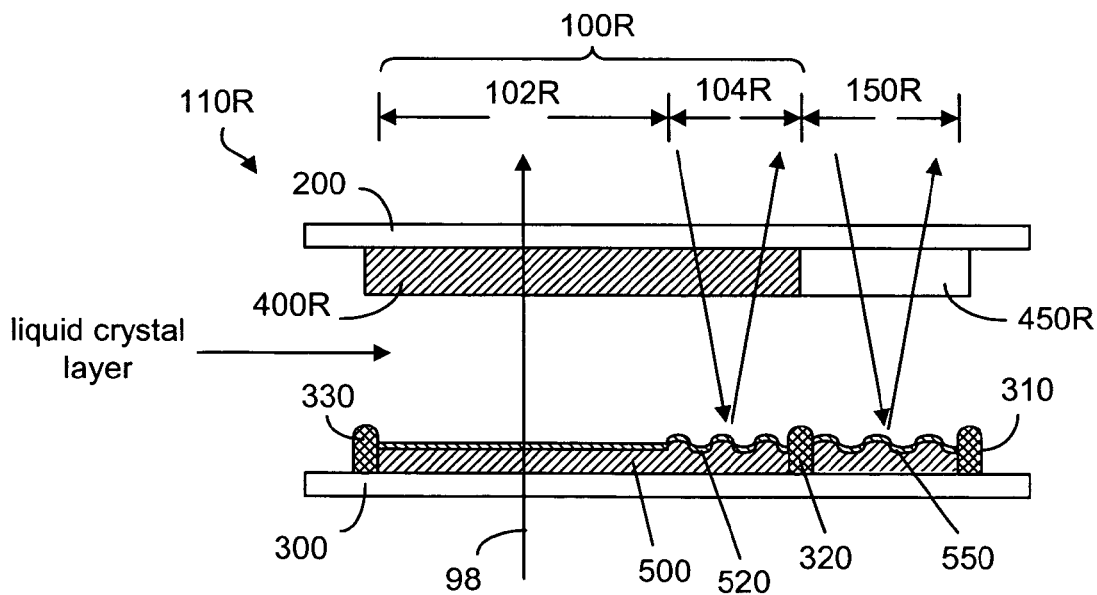
FIG. 9 is a cross sectional view of the sub-pixel structure of FIG. 8.

In a different embodiment of the present invention, the auxiliary sub-pixel area 150R comprises a color filter area 158R and a clear area 156R adjacent to each other, as shown in FIG. 7d. In this case, the color filter area 158R comprises a red color filter, similar to the color filter 400R (FIGS. 8 and 9). Alternatively, the color filter area 158R can be disposed in the middle of the clear area 156R, as shown in FIG. 7e. It is possible that the color filtering in the auxiliary sub-pixel area 150R has a different transmissivity than that of the color filter 400R. For example, the color filter area 160R, as shown in FIG. 7f, has a higher transmissivity than that of the color filter 400R. The color filter area 160R can occupy a part of or the entire auxiliary sub-pixel area 150R.

In another embodiment of the present invention, the auxiliary sub-pixel area 150R is partially obscured by a substantially opaque material, such as a dark light-shield 170. The dark light-shield can be made of a material generally known as black-matrix (BM). BM light shield is commonly disposed on the upper substrate of a LCD panel for blocking stray light passing through the gap between the upper substrate and the lower substrate. BM can be constructed from a number of materials such as Cr, $Cr/CrO_x$, $Cr/CrO_x/CrO_xN_y$, and negative photo-resist, for example.

FIG. 8 is a schematic representation showing a sub-pixel structure of a sub-pixel segment, according to one embodiment of the present invention, and FIG. 9 is a cross sectional view of the sub-pixel structure of FIG. 8. As shown in FIGS. 8 and 9, the auxiliary sub-pixel area 150R is entirely reflective (see FIG. 7b). Light entering the auxiliary sub-pixel area 150R goes through an upper substrate 200, a substantially clear optical material 450R and a liquid crystal layer, and is reflected by a reflective layer 550. In the color sub-pixel SR (see FIG. 4), the transmission area 102R and the reflection area 104R are covered by a red color filter 400R. Light entering the reflection area 104R goes through the upper substrate 200, the color filer 400R and the liquid crystal layer, and is reflected by a reflective layer 520. The reflective layers 520 and 550 are a part of the device layer 500. The reflective layers 520 and 550 in the reflection areas 104R, 150R typically comprise one or more metallic layers, such as Al, Ag, Cr, Mo, Ti, AlNd.

Figure 3A:
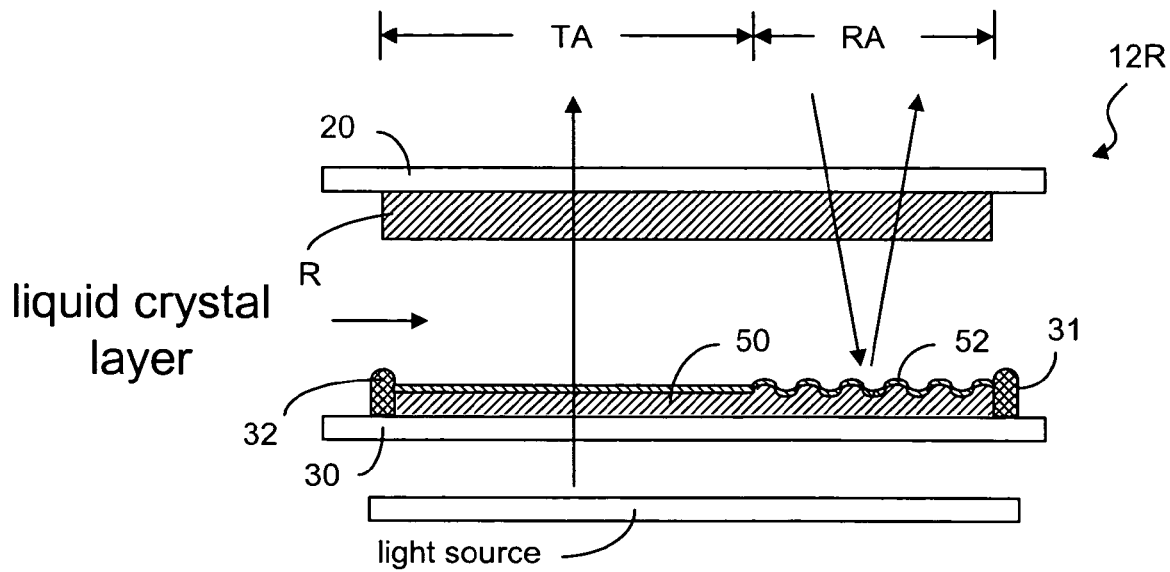
FIG. 3a is a cross sectional view showing the reflection and transmission of light beams in the pixel as shown in FIG. 2.
Figure 3B:
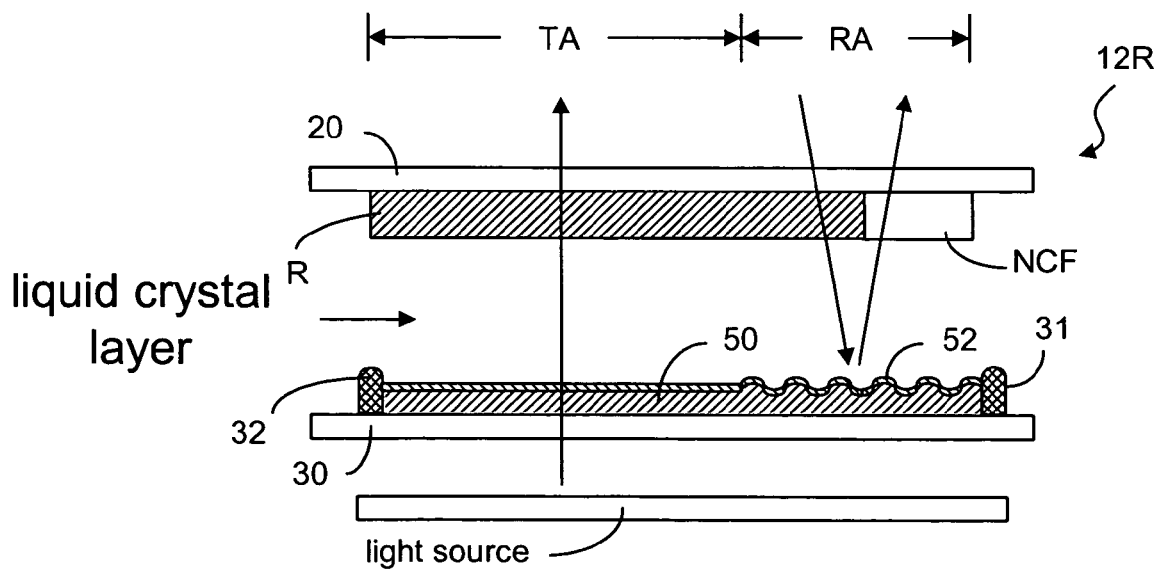
FIG. 3b is a cross sectional view showing the reflection and transmission of light beams in another prior art transflective display.

In the transmission area 102R, light enters a lower substrate 300, the device layer 500, the liquid crystal layer, the color filter 400R and the upper substrate 200. As shown in FIG. 9, the light beam 98 encountering the transmission area 102R is usually originated from a back-light source (see FIG. 3).

Figure 10:
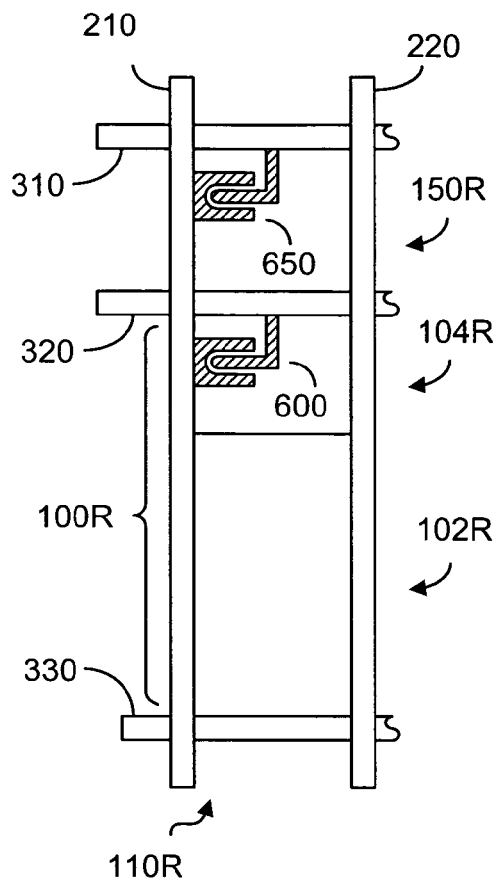
FIG. 10 is a schematic representation showing the control elements in a sub-pixel segment, according to one embodiment of the present invention.

The sub-pixel segment 110R is electronically controlled by data lines 210, 220, gate lines 310, 320, 330 and the device layer 500, as shown in FIG. 9. It should be noted that the liquid crystal layer is an electronically controllable optical medium, which can be electronically controlled to change the light transmission property at each sub-pixel area. For example, the liquid crystal layer area in the color sub-pixel area 100R, as shown in FIG. 9, is electronically controlled by a semiconductor switching device 600, and the liquid crystal layer area in the auxiliary sub-pixel area 150R is separately controlled by another semiconductor switching device 650, as shown in FIG. 10. The semiconductor device 600 is operatively connected to the data line 210 and the gate line 310. The semiconductor device 650 is operatively connected to the data line 210 and the gate line 320.

Figure 1:
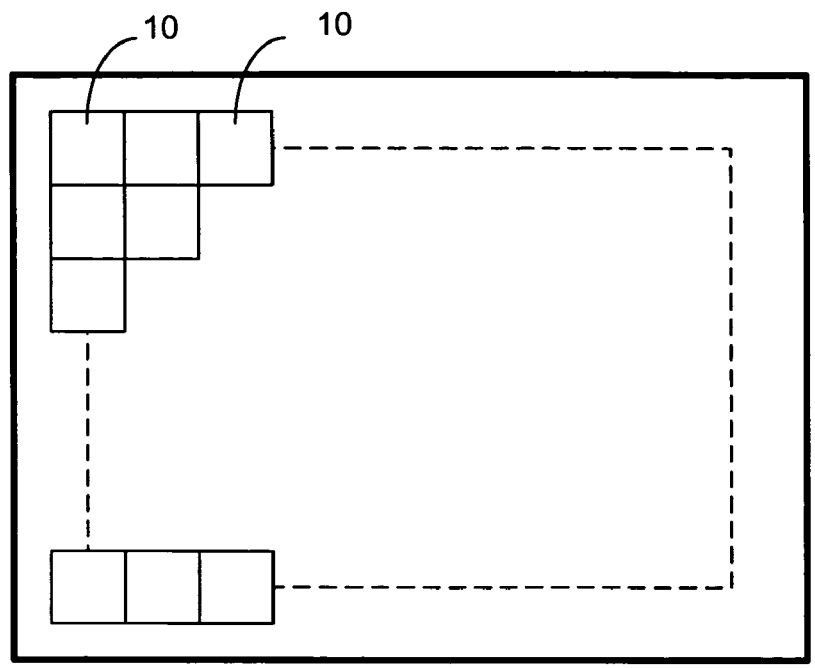
FIG. 1 is a schematic representation showing a typical LCD display.
Figure 2:
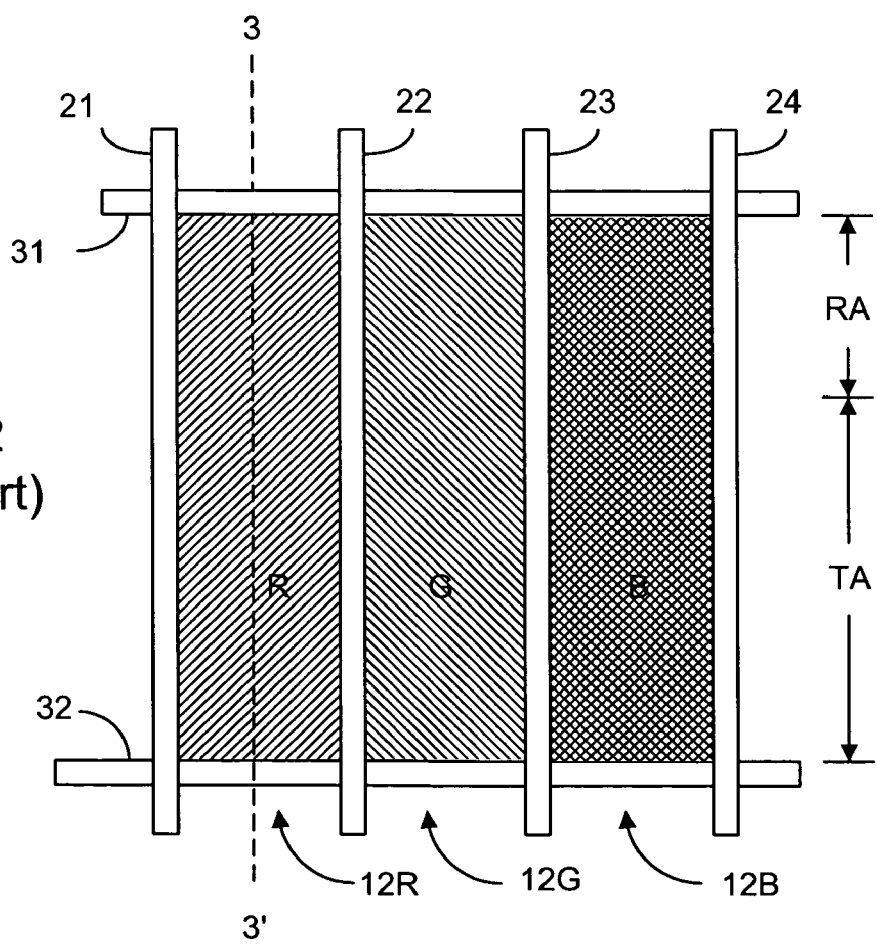
FIG. 2 is a plane view showing the pixel structure of a conventional transflective color LCD display.
Figure 11A:
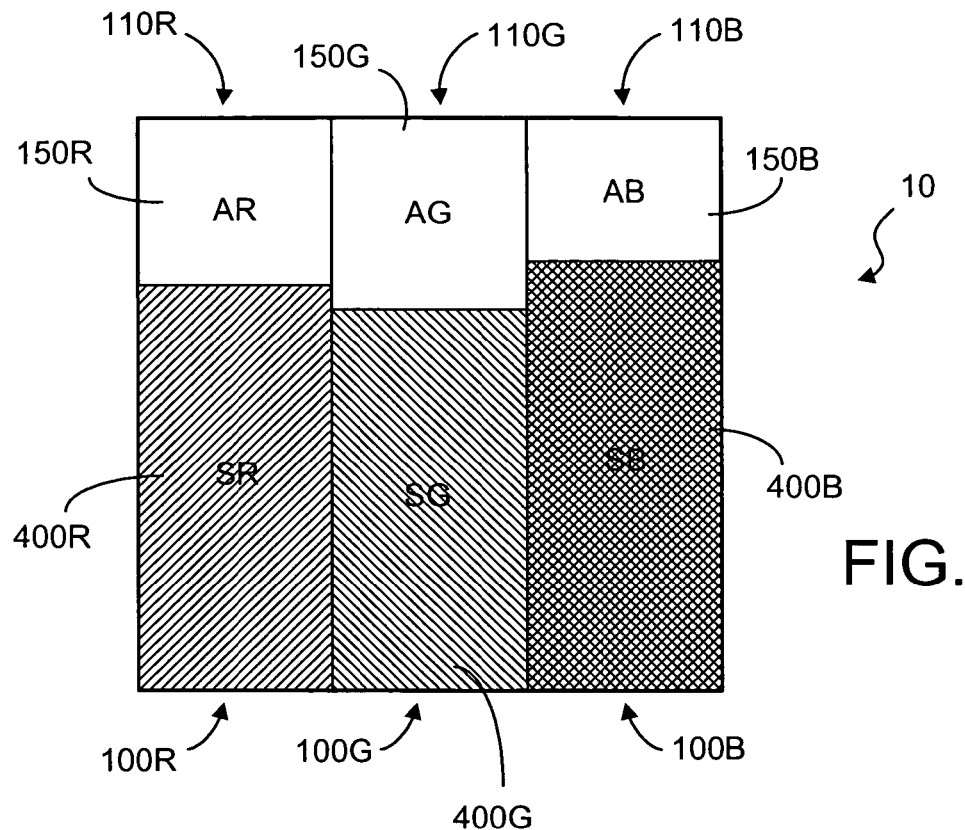
FIG. 11a is a schematic representation showing the color filtering scheme used in a pixel, according to one embodiment of the present invention.
Figure 11B:
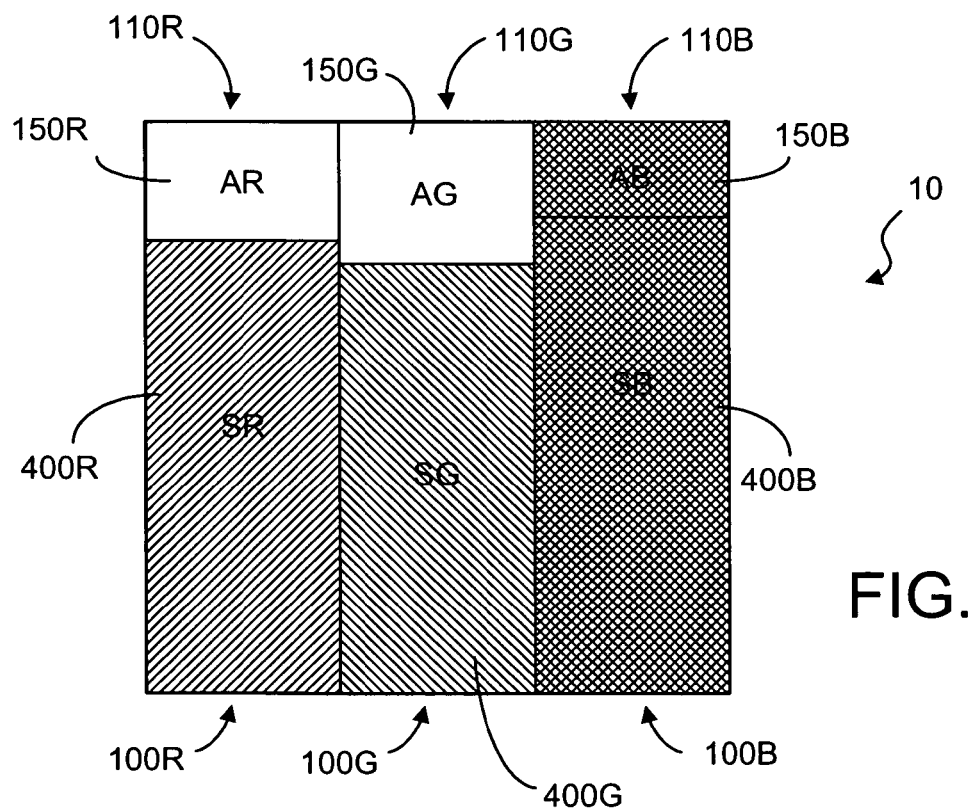
FIG. 11b is a schematic representation showing the sectioning of the sub-pixel segments, according to another embodiment of the present invention.
Figure 11C:
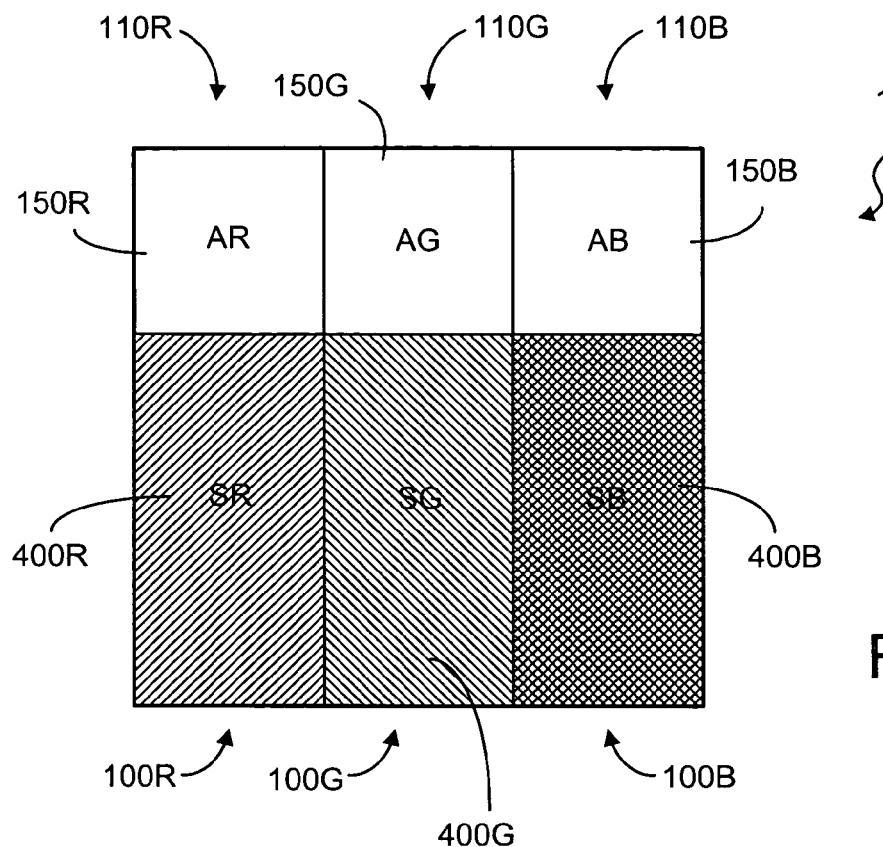
FIG. 11c is a schematic representation showing the color filtering scheme used in a pixel, according to the preferred embodiment of the present invention.
Figure 11D:
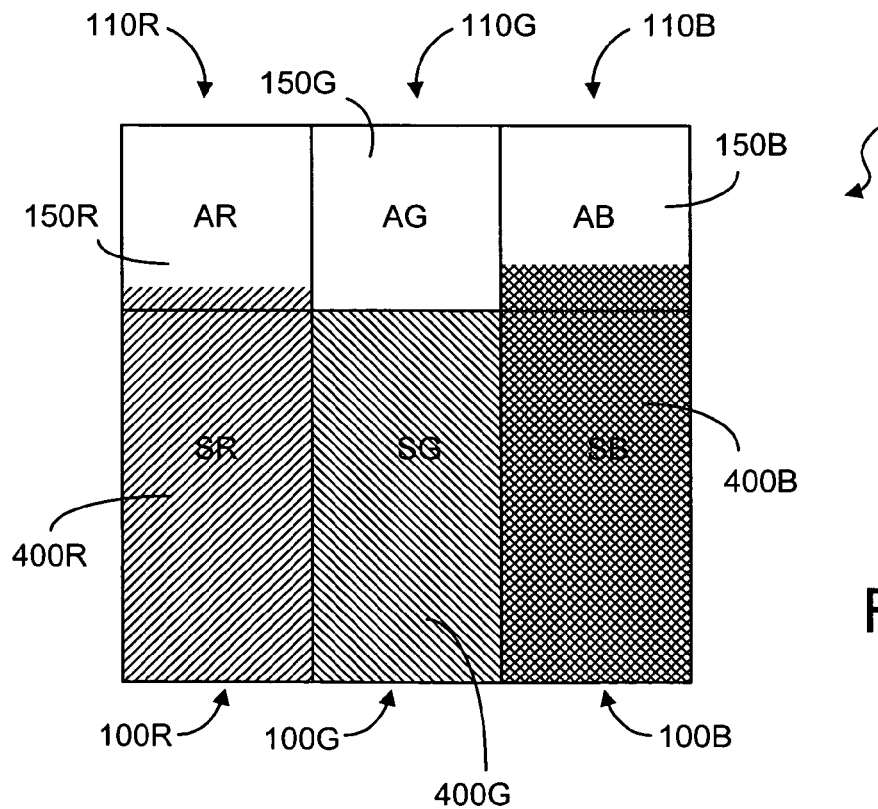
FIG. 11d is a schematic representation showing the sectioning of the sub-pixel segments, according to another embodiment of the present invention.

It should be noted that the relative sizes of the auxiliary sub-pixels are at least partly dependent upon the optical characteristics of the liquid crystal, the color filters and the spectral contents in the back-light source and ambient light. Likewise, similar factors also partly determine the relative sizes of the color filters 400R, 400B and 400G. For example, the color filters 400R, 400B and 400G and the corresponding color sub-pixel areas 100R, 100G and 100B are substantially the same size, as shown in FIG. 11a. However, one or more of the color filters and the corresponding sub-pixel areas can be different in size. For example, the color filter 400B is larger than the color sub-pixel area 100B, as shown in FIG. 11b. Likewise, in the embodiment where the color sub-pixel areas 100R, 100G and 100B are equal, the size of the color filters 400R, 400B and 400G are substantially the same, as shown in FIG. 11c. It is also possible that one or more of the color filters and the corresponding sub-pixel areas are different in size. For example, the color filter 400R is larger than the color sub-pixel area 100R and the color filter 400B is also larger than the color sub-pixel area 10B, as shown in FIG. 1d. In general, however, the blue color filter 400B is greater than the red color filter 400R, which is greater than the green color filter 400G.

In sum, the pixel structure of a pixel in a transflective-type LCD display, according to the present invention, comprises a plurality of sub-pixel segments, at least one of the sub-pixel segments comprises a color sub-pixel and an auxiliary sub-pixel associated thereto. The color sub-pixel comprises a transmission area and a reflection area, with both areas covered by a color filter. The auxiliary sub-pixel can be tailored to suit the optical characteristics of the LCD display in order to improve the color quality of the display, for example. In general, a transflective color LCD display comprises three color sub-pixel segments for providing light components in three colors. The three colors are red, green and blue, for example. It is possible that one or two or three of the sub-pixel segments can have a color sub-pixel and an auxiliary sub-pixel.

It should be noted that the present invention has been disclosed in reference to a transflective display using a liquid crystal layer as a light transmission controlling medium. It should be understood that liquid crystal is an electronically controllable optical medium, the optical property of which can be changed by a local electric field. In general, the present invention is applicable to a display wherein an optical medium is used to control the light transmission of the display, and wherein the optical medium can be electronically controlled in order to change the optical property of the medium at a pixel and sub-pixel level.

Thus, although the invention has been described with respect to one or more embodiments thereof, it will be understood by those skilled in the art that the foregoing and various other changes, omissions and deviations in the form and detail thereof may be made without departing from the scope of this invention.

What is claimed is:

1. A method to improve viewing quality of a transflective liquid crystal display, the display having a plurality of pixels, at least some of the pixels comprising a plurality of sub-pixel segments, said method comprising:
    sectioning at least one of the sub-pixel segments in each of said at least some pixels into a first sub-pixel and a second sub-pixel associated with the first sub-pixel; and
    sectioning the first sub-pixel into a transmission area and a reflection area, wherein said at least one of the sub-pixel segments are connected to a first gate line for controlling a liquid crystal layer segment associated with the first sub-pixel, and a second gate line for controlling a different liquid crystal layer area associated with the second sub-pixel.

2. The method of claim 1, wherein each of said plurality of sub-pixel segments in a pixel is associated with a color for viewing, said method further comprising:
    filtering light encountering the first sub-pixel to provide the color associated with the sub-pixel segment.

3. The method of claim 1, wherein said plurality of sub-pixel segments in a pixel comprises three color sub-pixel segments in red, green and blue, said method further comprising:
    filtering light encountering the first sub-pixel in each of said at least one of the sub-pixel segments to provide a color associated with the color sub-pixel segment.

4. The method of claim 1, wherein each of said plurality of sub-pixel segments in a pixel is associated with a color, and the display has a front side for viewing and an opposing backside, and wherein the display comprises a back-light source on the backside for supplying light through the transmission area for viewing, said method comprising:
    filtering the light supplied through the transmission area to provide the color associated with the sub-pixel segment.

5. The method of claim 4, wherein an external light source provides reflected light in the reflection area, said method further comprising:
    filtering the reflected light in the reflection area to provide the color associated with the sub-pixel segment.

6. The method of claim 1, further comprising:
    sectioning the second sub-pixel into a transmission area and a reflection area.

7. The method of claim 1, further comprising:
    partially filtering light encountering the second sub-pixel according to the color associated with the sub-pixel segment.

8. A transflective display comprising:
    an electronically controllable optical medium for forming a plurality of pixels, wherein at least some of the pixels comprise a plurality of sub-pixel segments, each of the sub-pixel segments in a pixel associated with a color for viewing, and at least one of the sub-pixel segments in each of said at least some pixels comprises a first sub-pixel and a second sub-pixel associated with the first sub-pixel;
    a color filter disposed in relationship to each of the sub-pixel segments for filtering light encountering the first sub-pixel for providing the color associated with said sub-pixel segment, wherein the first sub-pixel comprises a transmission area and a reflection area; and
    a device layer disposed in relationship to the electronically controllable optical medium for controlling the optical medium, wherein the device layer is operatively connected to a first gate line for electrically controlling the optical medium associated with the first sub-pixels and a second gate line for electrically controlling the optical medium associated with the second sub-pixels.

9. The transflective display of claim 8, further comprising:
    a layer of reflection material disposed in each of said reflection areas for reflecting light encountering the reflection areas.

10. The transflective display of claim 8, further comprising:
    a front side for viewing, and
    an opposing backside to allow light to be transmitted from the backside to the front side through the transmission area and the color filter.

11. The transflective display of claim 10, further comprising:
    a light source disposed in relationship to the backside to provide the transmitted light through the transmission area and the color filter.

12. The transflective display of claim 8, wherein the device layer comprises
    an electronic switching component disposed in relationship to the first sub-pixel for controlling the optical medium associated with the first sub-pixel; and
    a different electronic switching component disposed in relationship to the second sub-pixel for controlling the optical medium associated with the second sub-pixel.

13. The transflective display of claim 8, wherein the electronically controllable optical medium comprises a liquid crystal layer.

14. The transflective display of claim 8, wherein
each of at least some of the second sub-pixels is sectioned into a transmission sub-area and a reflection sub-area.

15. The transflective display of claim 8, wherein
each of at least some of the second sub-pixels is entirely transmissive.

16. The transflective display of claim 8, wherein
each of at least some of the second sub-pixels is entirely reflective.

17. The transflective display of claim 8, wherein
at least some of the second sub-pixels comprise color filters for partially filtering light encountering the second sub-pixels according to the color associated with the sub-pixel segments.

18. The transflective display of claim 8, wherein
at least some of the second sub-pixels comprise light blocking sections for reducing the amount of light encountering the second sub-pixels.

19. The transflective display of claim 8, wherein
at least some of the second sub-pixels comprise non-color filters for transmitting light encountering the second sub-pixels.

20. The transflective display of claim 8, wherein
at least some of the second sub-pixels comprise color filters for partially filtering light encountering the second sub-pixels according to the color associated with the sub-pixel segments, wherein the color filters have higher transmissivity than the color filters for filtering light encountering the first sub-pixels.

21. The transflective display of claim 8, wherein
the plurality of sub-pixel segments in each of said at least some of the pixels comprise:
a first sub-pixel segment associated with a red color for viewing,
a second sub-pixel segment associated with a green color for viewing, and
a third sub-pixel segment associated with a blue color for viewing.

22. The transflective display of claim 21, wherein the color filter associated with the third sub-pixel is larger than the color filter associated with the first sub-pixel.

23. The transflective display of claim 22, wherein the color filter associated with the first sub-pixel is larger than the color filter associated with the second sub-pixel.

24. The transflective display of claim 21, wherein the second sub-pixel associated with the second sub-pixel segment is larger than the second sub-pixel associated with the first sub-pixel segment.

25. The transflective display of claim 24, wherein the second sub-pixel associated with the first sub-pixel segment is larger than the second sub-pixel associated with the third sub-pixel segment.

26. The transflective display of claim 21, wherein the second sub-pixels associated with the first sub-pixel segment, the second sub-pixel segment and the third sub-pixel segment are substantially equal in area.

\* \* \* \* \*